United States Patent Office 3,114,744
Patented Dec. 17, 1963

3,114,744
POLYMERIZATION OF ISOPRENE TO TRANS-1,4-POLYISOPRENE WITH A $VCl_3$ - $Ti(OR)_4$ - $AlR_3$ CATALYST
Jack S. Lasky, Verona, N.J., assignor to United States Rubber Company, New York, N.Y., a corporation of New Jersey
No Drawing. Filed Oct. 25, 1960, Ser. No. 64,716
8 Claims. (Cl. 260—94.3)

This invention relates to the polymerization of isoprene. More particularly, this invention relates to a method of accelerating the rate of polymerization of isoprene to trans-1,4-polyisoprene, a substance which is substantially identical to natural balata. The method of this invention involves the use of an improved catalyst system to effect the accelerated rate of polymerization.

The specific catalyst system which I have found to give tremendously enhanced polymerization requires (a) vanadium trichloride, (b) an aluminum trihydrocarbyl, and (c) a tetra-hydrocarbyl titanate. This latter component, the titanium derivative, is what yields the accelerating effect.

In the field of heterogeneous catalysis, it is well known and is now becoming even more increasingly apparent that the success of a catalyst in effecting the polymerization of one monomer is no basis for predicting the effect of the same or a similar catalyst in the polymerization of another monomer.

Trans-1,4-polyisoprene has been previously prepared, as disclosed in Belgian Patent 545,952, using a catalyst made by reacting an aluminum trialkyl with a trihalide of vanadium or titanium. I have found that using vanadium trichloride and an aluminum trialkyl in accordance with the teachings of the aforesaid Belgian patent does indeed yield trans-1,4-polyisoprene. However, I have also found the yield with such a catalyst system to be extremely low. The best yield which I could obtain was about 120 grams of polymer per gram of vanadium trichloride employed. Even in that case, the efficiency of the reaction, expressed in grams of polymer per gram of vanadium trichloride per hour of reaction, was extremely low, the best I have been able to obtain being about 1.30 to 1.60.

In my copending application, Serial No. 799,424, filed March 16, 1959, now U.S. Patent 3,054,754, granted September 18, 1962, I have disclosed a method of improving the efficiency of this polymerization involving a supported catalyst. The vanadium trichloride was disclosed as being supported on a finely-divided inert supporting medium such as clay or titanium dioxide. This supported material is prepared through decomposition of $VCl_4$ to $VCl_3$ in the presence of the supporting medium. The aluminum trialkyl need not be supported. By this method, I was able to obtain a much more efficient polymerization system. The yield of polymer ranged as high as 500 grams of polymer per gram of vanadium trichloride with an efficiency of some 15 to 20 grams of polymer per gram of vanadium trichloride per hour of reaction time.

By use of the present invention, I have been able to increase the polymerization efficiency to as high as 4000 to 6000 grams of polymer per gram of vanadium trichloride and to as high as 600 to 700 or more grams of polymer per gram of vanadium trichloride per hour of reaction time. Even if I use the vanadium trichloride in an unsupported condition, the reaction efficiency is vastly improved over that previously attainable.

This result is even more surprising when it is realized that the literature discloses the use of an aluminum trialkyl with a tetra-alkyl titanate as a catalyst for polymerizing isoprene, not to 1,4-polyisoprene, but rather to 3,4-polyisoprene. Thus I have now discovered that a catalyst system which gives a low yield of 1,4-polyisoprene may be combined with a catalyst system which gives low yields of 3,4-polyisoprene to surprisingly give extremely high yields of essentially pure trans-1,4-polyisoprene.

It is desirable that the vanadium trichloride component of my catalyst be supplied in a fine state of subdivision so that it can react as rapidly and as completely as possible with the other ingredients so as to give the most efficient results. For this reason, I prefer to disperse the vanadium trichloride on the surface of a finely divided inert solid carrier, such as clay, silica, alumina, magnesia, titania, etc., in the proportion of about 5 to 40 parts of vanadium trichloride by weight per 100 parts of the combined carrier plus vanadium trichloride. The preferred range is from 10 to 30 parts of $VCl_3$ by weight. Methods for preparing such supported $VCl_3$ are described in detail in my above-identified copending application, the disclosure of which is incorporated herein by reference. It should be understood, however, that the present invention is not dependent upon the use of such supported $VCl_3$. Using finely divided unsupported $VCl_3$, the catalysts of the present invention yield high quality synthetic balata of substantially 100% trans-1,4 structure at a rate and with a catalyst efficiency hitherto unknown. Use of supported $VCl_3$ further increases the efficiency. The vanadium trichloride is the only one of the three active catalyst components which is insoluble in the solvent employed.

The aluminum trihydrocarbyl used in making my catalyst may be represented by the formula $AlR_3$, in which R is any saturated aliphatic (including alicyclic), aromatic, or aromatic substituted saturated aliphatic (aralkyl) hydrocarbon radical, including straight-chain and branched saturated alkyl radicals typically having from 1 to 18 carbon atoms such as methyl, ethyl, n-propyl, isopropyl, n-butyl, isobutyl, hexyl, dodecyl, etc; saturated cyclo-alkyl radicals, such as cyclopentyl and cyclohexyl and their alkyl-substituted derivatives; aromatic radicals, such as phenyl, o-, m- and p-tolyl, etc; and aralkyl radicals, such as alpha-tolyl, phenethyl, etc. While the size and nature of the hydrocarbon radical R in the aluminum trihydrocarbyl are not critical factors in my invention, I generally prefer to use compounds in which R is saturated alkyl and contains from 2 to 6 carbon atoms. Especially preferred compounds are the propyl and butyl derivatives, because of their availability, relatively low cost, ease of handling, and effectiveness. Aluminum tri-isobutyl is particularly suitable. It should be noted that the alkyl aluminum halides are not suitable for use in my method.

As to the tetrahydrocarbyl orthotitanate used, the invention is operable with a wide variety of esters, wherein the hydrocarbyl radical may be a saturated alkyl group such as methyl, ethyl, propyl, isopropyl, butyl, isobutyl, 2-ethylbutyl, dodecyl, octadecyl, etc.; a saturated cycloalkyl group such as cyclohexyl, cyclopentyl, and the alkyl-substituted derivatives thereof; an aromatic group such as phenyl, o-, m-, and p-tolyl, etc.; or an aralkyl group such as alpha-tolyl, phenethyl, etc.

As is well known, the methyl and ethyl titanates are more susceptible to hydrolysis than are the higher alkyl derivatives. The higher the molecular weight, the more stable against hydrolysis the esters become. For practical reasons, I prefer to use esters in which the hydrocarbyl radical is a member of the saturated alkyl series having from 3 to 8 carbon atoms, such as isopropyl, isobutyl, 2-ethylbutyl, and 2-ethylhexyl.

A solvent is generally used in carrying out my invention as indicated below. The solvent may be any inert liquid hydrocarbon of the aromatic, saturated aliphatic, or saturated alicyclic series, or a mixture of these. Aromatic solvents, such as benzene and toluene, are usually preferred. Aliphatic and alicyclic hydrocarbons, such as the normal and branched alkanes, and cyclopentane, cyclohexane, and their derivatives, may be used, but are found to result in slower polymerization rates than the aromatic solvents. However, the polymerization rates obtainable with my catalysts are so high that it may be desirable in some cases to moderate them. One way of doing this is to use a solvent which is partially or wholly aliphatic such as butane, pentane, hexane or heptane alone or in admixture with an aromatic solvent. The solvent will usually be chosen so as to have a boiling point in the range of about $-10°$ C. to $150°$ C., for convenience in handling the reaction mixture and in removing the solvent from the polymer. It is highly desirable that the solvent be substantially free of water, alcohols, and other impurities. These impurities might react with and destroy the catalyst. The usual methods of solvent purification followed by careful handling are generally sufficient. A satisfactory and well known method of purification comprises passing the solvent through chromatographic columns packed with coconut charcoal and silica gel and thereafter storing the solvent over sodium ribbon.

The isoprene to be polymerized is also preferably free of impurities which might react with the catalyst. Compounds which contain active hydrogen atoms or which are in and of themselves polymerizable should best be eliminated. Dimethyl acetylene in particular should not be present in the reaction mixture. I have found that satisfactory purification of the isoprene may be had by repeated fractional distillation and/or passage of the monomer through a column packed with silica gel and an inclusion compound such as "Molecular Sieve #5A" manufactured by Linde Air Products Co.

The method of preparing the catalyst used in my invention is best carried out with finely divided vanadium trichloride. I prefer to use supported vanadium trichloride made as described in my above-mentioned copending patent application. Best results are obtained when the vanadium trichloride is in suspension in a stirred solvent solution of the other two active catalyst components. Mixing the components in the absence of a solvent gives a catalyst of lower activity. Isoprene should generally not be present during the formation of the active catalyst since its presence results in a lower rate of polymerization and yield. This may be so because polymerization on the surface of the $VCl_3$ may interfere with catalyst formation.

The order of mixing the catalyst components is not critical, except that the hydrocarbonaluminum and the titanate should not be brought together in the absence of the $VCl_3$. The temperature at which ahe catalyst is formed, while not critical, is preferably between about $0°$ C. and about $50°$ C. This catalyst forming operation is conveniently carried out at room temperature. If the temperature is too high, the catalyst formed may have a lower activity while if too low a temperature is employed, the catalyst-forming reaction may be too slow. Once formed, the catalyst should be used fairly promptly since it tends to deteriorate rapidly upon standing. A preferred method for preparing the catalyst now follows:

A dilute solution of the titanate in the solvent is prepared. Generally about a 1% to 5% solution by weight is preferred. To this, the required amount of finely divided vanadium trichloride is added with agitation. A dilute solution of the aluminum trihydrocarbyl in the solvent is then formed and added to the mixture while agitation is continued. The aluminum trihydrocarbyl solution should preferably be fairly dilute. Good results are obtained when a 5 to 20% by weight aluminum trihydrocarbyl solution is employed.

The mixture of the three catalyst components may, if desired, then be filtered or decanted, and the resulting clear liquid used as the catalyst. However, I have found that the rate of polymerization and the yield of polymer are higher if the entire mixture is employed without any separation step. Apparently, either the insoluble portion includes an active catalyst species or else it generates additional soluble catalyst during the polymerization.

As soon as catalyst formation is complete, the monomer and any additional solvent desired may be added. The additional solvent and monomer may be mixed together before addition or they may be added simultaneouly. The entire reaction mixture may then be heated at a temperature in the range of $40°$ C. to $120°$ C. The polymerization reaction should be continued until the desired amount of polymer is obtained. For batch polymerization, temperatures of $50°$ C. to $90°$ C. are preferred. At lower temperatures, the polymerization rate is considerably decreased, and there may be a tendency to form highly cross-linked material. This is especially so if an aliphatic hydrocarbon solvent is used. In continuous polymerization techniques, where the highest possible rate is desired, the temperature should be maintained at from about $60°$ C. to $90°$ C. If the temperature is too high, decomposition of the catalyst may occur with resultant low yields.

All of the operations in forming the active catalyst and in carrying out the polymerization are preferably performed in an inert atmosphere, while using particular care to exclude water, oxygen, and carbon dioxide. An atmosphere of dry nitrogen or argon is satisfactory. Alternatively, an atmosphere of isoprene is highly satisfactory in carrying out the polymerization but is not desirable in forming the catalyst.

Upon completion of the polymerization, the catalyst may be inactivated by mixing the charge with methanol, ethanol, water, steam or some other material, including alcohols and ketones, which reacts with the catalyst, dissolves the catalyst residue, and precipitates the polymer. Preferably, enough of this solvent-precipitant is used to cause most of the catalyst residue to be washed out of the polymer. From 0.5 to 3 volumes of solvent-precipitant for each volume of the charge is generally sufficient. The polymer may then be dried, preferably under vacuum and generally at a temperature of about $40°$ C. to $60°$ C.

Methods of catalyst formation in which the dilution of the ingredients is much greater than that outlined above, for example, when all the solvent is initially present, give slightly less active catalysts. Dilution slows down and perhaps modifies the catalyst-forming reactions. Acceptable reaction rates are nevertheless obtainable with catalysts prepared in the presence of all the solvent.

Initially, the vanadium trichloride component is the only active component of the catalyst that is insoluble in the solvent employed. Both the aluminum and the titanium compounds should be soluble in the solvent.

The amount of vanadium trichloride used in the catalyst mixture, based upon polymerizing 100 grams of isoprene in the presence of about 50 to 200 grams of solvent, may vary over a wide range, from about 2 milligrams (0.013 millimole) to 1 gram (6 millimoles) or more. In the lower ranges, very high catalyst efficiency (grams of polymer per gram of $VCl_3$) is obtained, but the rate is relatively slow and furthermore, the purification of solvent and monomer must be very complete to avoid contamination of the minute amount of catalyst present. At the other extreme, using relatively large amounts of $VCl_3$ gives low catalyst efficiency, and is generally unnecessary to the attainment of a good reaction rate. Good results are normally obtained with from about 10 to 200 milligrams of $VCl_3$ per 100 grams of isoprene.

The proportion of aluminum trihydrocarbyl to vanadium trichloride, expressed as the molar ratio of $AlR_3$ to $VCl_3$ (Al/V), may vary over a wide range, from as low as one or two moles of $AlR_3$ per mole of $VCl_3$ to as high as 200 moles of $AlR_3$ per mole of $VCl_3$. Preferably, this ratio should be between 5/1 and 20/1 to get high catalyst efficiency and fast reaction rate.

Similarly, the molar ratio of $VCl_3$ to titanium compound (V/Ti) may vary from about one mole of $VCl_3$ per 8 moles of titanium compound to about 8 moles of $VCl_3$ per mole of titanium compound. The preferred range for V/Ti is from about 1/2 to about 4/1.

Put on a somewhat different basis, the molar ratio Al/V may vary from 2 to 1 up to 200 to 1 while the molar ratio of aluminum compound to titanium compound (Al/Ti) may vary from about 2 to 1 to about 80 to 1. Particularly good results are obtained when the Al/V ratio ranges from about 5 to 1 to about 80 to 1 and the Al/Ti ratio varies from about 5 to 1 to about 40 to 1. The preferred catalyst system employs an Al/V ratio of from about 5 to 1 to about 20 to 1 and an Al/Ti ratio of from about 10 to 1 to about 20 to 1.

The polymerization rate may be controlled by varying the total amount of catalyst or by diluting the polymerization mixture with additional solvent. Dilution of the polymerization mixture with solvent reduces the polymerization rate. However, some solvent is necessary during preparation of the catalyst as described above and it is usually desirable to dilute the reaction mixture enough so that the polymer solution at the end of the polymerization will be fluid. The dilution needed will depend upon the extent of conversion of monomer to polymer. There is no definite upper limit to the extent of dilution, but economic considerations will of course dictate keeping the dilution of the system as low as possible consistent with other requirements. For a batch process, with 50–100% conversion of monomer, a dilution in the range of 1 to 5 parts of solvent per part of monomer by weight is generally suitable.

Further details on the method of carrying out my invention may be had by consulting the following working examples.

*Example I*

This example represents the practice of my invention. The molar ratios employed were Al/V=10/1, V/Ti=2/1 and Al/Ti=20/1.

35 milligrams of $VCl_3$ supported on clay were prepared in accordance with the procedure set forth in my copending application, Serial No. 799,424, filed March 16, 1959. The $VCl_3$ formed 18% by weight of the clay-$VCl_3$ mixture.

The supported $VCl_3$ was then dispersed at room temperature in a dilute solution of tetra(2-ethylbutyl) titanate $[Ti(OC_6H_{13})_4]$ in benzene containing 50 milligrams of titanate in a concentration of 1% by weight. A 10% solution by weight of aluminum tri-isobutyl containing 442 mg. dissolved in benzene was added gradually to the resultant mixture over a period of about 3 minutes with agitation. Agitation continued for about 10 minutes. All the above was carried out in an argon atmosphere.

Additional benzene was added simultaneously with the addition of 100 grams of isoprene. Total benzene present after complete addition was 120 grams. The reactor was then sealed and the temperature raised to 50° C. and maintained there for 72 hours while agitation continued. At the end of this time, the reaction mixture was poured into a vessel containing 1 liter of methanol (containing 1–2 gm. of "Antioxidant 2246"*) to precipitate the poly- \* 2,2'methylene bis(4-methyl-1-6-tert-butyl phenol).

mer. The slurry was chopped and stirred in a high speed rotary mixer and the polymer was then separated from the liquid and dried in a vacuum oven at 40° C. The yield of polymeric material was 100 grams, an apparent conversion of 100%. On infrared analysis, the polymeric material prepared in this example appeared identical with a sample of natural balata similarly analyzed.

The following table illustrates a comparison of the physical properties of natural balata with the synthetic polymer prepared in accordance with this example.

| Property | Balata | Synthetic Polymer |
|---|---|---|
| Mooney Viscosity (ML-4 at 212° F.) | 20–30 | 90–150 |
| 300% Modulus, p.s.i. | 2,250 | 2,200 |
| Tensile, p.s.i. | 3,680 | 4,400 |
| Elongation, percent | 440 | 480 |
| Hardness (Shore D) | 43 | 40 |
| Torsional Modulus, p.s.i. | 42,000 | 34,000 |
| First transition point, °C. | 57 | 56 |
| Second transition point, °C. | 65 | 62–64 |
| Solubility: | | |
| Benzene at 75° C. | (1) | (2) |
| Tetralin at 135° C. | (1) | (1) |

[1] Complete.
[2] Highly swollen gel.

The chief differences between the two polymers, in Mooney viscosity and in solubility, are due to the higher molecular weight of the synthetic polymer. Milling this polymer for a few minutes at a temperature in the range of 250 to 325° F. reduced the Mooney viscosity of 20–30, and caused the polymer to dissolve in benzene.

The synthetic polymer can be cured by methods applicable to natural balata to give a product similar to cured natural balata.

The chief use of balata is in golf ball covers. Tests of the synthetic product indicated that it was equivalent to natural balata for this application in all important respects.

*Example II*

This example serves to show the vast improvement brought about by my invention. The procedure of Example I was followed except that in stock B, the titanate was omitted and proportions were as indicated. Stock B therefore represented a prior art method for polymerizing isoprene except that supported $VCl_3$ was employed in accordance with the teaching of my copending application referred to above.

| Stock | A | B |
|---|---|---|
| Isoprene, gms | 100 | 100 |
| $VCl_3$ mg | 70 | 70 |
| Al/V molar ratio | 5:1 | 5:1 |
| V/Ti molar ratio | 2:1 | (1) |
| Benzene, gms | 120 | 120 |
| Reaction Temp., °C. | 50 | 50 |
| Reaction Time, hrs | 17 | 72 |
| Yield, gm | 100 | 25 |

[1] No Ti.

Thus, it is easily apparent that not only did the addition of a very small quantity of a titanate compound serve to increase the yield 400% but this increase was obtained despite a 55 hour decrease in reaction time.

*Example III*

Although I prefer to use supported $VCl_3$, my invention also is operative and beneficial when unsupported $VCl_3$ is employed. In this example, finely divided $VCl_3$ was charged to the reaction medium in an unsupported state. Procedure otherwise was in accordance with Example I with proportions as indicated below.

| | |
|---|---|
| Isoprene, gms | 100 |
| $VCl_3$, mg | 70 |
| Al/V molar ratio | 20:1 |
| V/Ti molar ratio | 2:1 |
| Benzene, gms | 120 |

Reaction temp_____ 50
Reaction time, hrs_____ 18
Yield, gms_____ 54.8

Example IV

This example shows the unexpected character of my invention in that the beneficial results obtained thereby are specific to only one system. As stated above, the literature discloses the use of either $TiCl_3$ or $VCl_3$ taken in conjunction with an aluminum trialkyl as a catalyst for production of trans-1,4-polyisoprene. Surprisingly, the titanates do not have any beneficial effect on the $TiCl_3$ system.

The catalyst systems used were as follows where catalyst F represented the system of this invention.

|  | E | F |
|---|---|---|
|  | $TiCl_3$ | $VCl_3$ |
|  | $AlR_3$ | $AlR_3$ |
|  | $TiX_4$ | $TiX_4$ |

In both cases $TiX_4$ was tetra(2-ethylbutyl) titanate and $AlR_3$ were aluminum tri-isobutyl. The detailed data was as follows:

| Stock | E | F |
|---|---|---|
| $VCl_3$ mg | | 70 |
| $TiCl_3$, mg | 69 | |
| $Al/VCl_3$ molar ratio | | 10:1 |
| $Al/TiCl_3$ molar ratio | 10:1 | |
| $VCl_3/VCl_4$ molar ratio | | |
| $TiCl_3/VCl_4$ molar ratio | | |
| $TiCl_3/TiX_4$ molar ratio | 2:1 | |
| $VCl_3/TiX_4$ molar ratio | | 2:1 |
| Isoprene, gm | 100 | 100 |
| Benzene, gm | 120 | 120 |
| Reaction Temp., °C | 50 | 50 |
| Reaction Time, hr | 2¼ | 1½ |
| Yield, gm | 0 | 30.3 |

It is readily apparent that only Stock F gave any effective results in the very short reaction time involved thus indicating that only the specific system of this invention is effective in increasing the rate of polymerization.

Example V

This example shows the use of several different ratios in producing synthetic balata in accordance with my invention. The procedure of Example I was followed. Aluminum tri-isobutyl and tetra-(2-ethylbutyl) titanate were employed.

| Stock | G | H | I | J | K | L |
|---|---|---|---|---|---|---|
| Wt. $VCl_3$ (mg.) | 4 | 8 | 8 | 17 | 35 | 70 |
| Al/V, molar ratio | 80/1 | 40/1 | 160/1 | 20/1 | 10/1 | 5/1 |
| V/Ti, molar ratio | 1/2 | 1/1 | 1/8 | 2/1 | 2/1 | 2/1 |
| Time (hrs.) at 50° C | 72 | 72 | 72 | 72 | 72 | 72 |
| Yield (gm.) | 12 | 38.2 | 53.6 | 80 | 100 | 100 |

Example VI

This example illustrates the use of several trihydrocarbylaluminum compounds in conjunction with tetra-(2-ethylbutyl) titanate. In each instance, the procedure of Example I was followed except as otherwise noted and 70 mg. of $VCl_3$ and 100 grams of isoprene were employed except in Stock P where 90 grams of isoprene were used. The molar ratio of aluminum to vanadium was equal to 10:1 and the molar ratio of vanadium to titanium was 2:1. Reaction temperature was 50° C. and the solvent was 120 grams of benzene.

| Stock | M | N | O | P |
|---|---|---|---|---|
| $AlR_3$ where R= | ethyl | isobutyl | n-dodecyl | phenyl |
| Reaction Time | 1½ hr | 1½ hr | 1½ hr | 18 hr |
| Yield | 2 gm | 30.3 gm | 59.6 gm | 86.9 gm |

In all cases, the yield represented a considerable increase over what was obtained when the titanate was omitted.

Example VII

This example illustrates the use of other titanates than the tetra (2-ethylbutyl) titanate employed in the previous examples. Procedure was in accordance with Example I except as otherwise noted. Seventy mg. of $VCl_3$, 100 grams of isoprene and a reaction temperature of 50° C. were employed. The solvent was 120 grams of benzene. In both cases, the reaction rate obtained was substantially faster than that achieved in a system not employing a titanate.

| Stock | Q | R |
|---|---|---|
| $TiX_4$ where X= | $OC_3H_7$(iso) | $OC_6H_5$ |
| Al/V, mole ratio | 5:1 | 10:1 |
| V/Ti, mole ratio | 2:1 | 2:1 |
| Reaction Time | 14 hr | 1½ hr |
| Yield | 100 gm | 84 gm |

Example VIII

This example shows the effect of temperature on the reaction system. As might be expected, increased efficiency is obtained with increased temperatures. In all cases, the procedure of Example I was followed using 100 grams of isoprene, 120 grams of benzene, 70 mg. of $VCl_3$, a 10:1 molar ratio of aluminum tri-isobutyl to $VCl_3$ and a 2:1 molar ratio of $VCl_3$ to tetra (2-ethylbutyl) titanate.

| Stock | U | V | W | X |
|---|---|---|---|---|
| Reaction Temperature, °C | 5 | 23 | 50 | 90 |
| Reaction Time, hr | 18 | 18 | [1] 90 | [1] 40 |
| Yield, gm | 9.1 | 61.8 | 30.3 | 44 |
| Average rate, gm./hr | 0.5 | 3.4 | 20 | 66 |

[1] Minutes.

Example IX

This example illustrates the effect of solvent type (aromatic vs. aliphatic) on the rate. Benzene, n-heptane and mixtures of these were used as solvent. Other factors were the same as in Example VIII except that reaction temperature was kept at 50° C.

| Stock | Y | Z | AA | AB |
|---|---|---|---|---|
| Benzene (gm.) | 120 | 80 | 40 | 0 |
| n-Heptane (gm.) | 0 | 40 | 80 | 120 |
| Time (hrs.) | 1½ | 1½ | 1½ | 1½ |
| Yield (gm.) | 30.3 | 28.5 | 22.0 | 17.0 |
| Average rate (gm./hr.) | 20 | 19 | 15 | 11 |

The rate in n-heptane, an aliphatic solvent, is about one half the rate in benzene, an aromatic solvent.

Example X

In this example, the dilution during polymerization was varied in order to show, as might be expected, that increased dilution decreases the rate of reaction. All conditions were the same as in Example IX. Reaction time was 1¾ hours.

| Stock | AC | AD | AE |
|---|---|---|---|
| Wt. benzene, g | 120 | 240 | 480 |
| Yield, g | 46.6 | 34.2 | 11.0 |
| Average rate, gm./hr | 27 | 20 | 6 |

Having thus described my invention what I claim and desire to protect by Letters Patent is:

1. A method for making trans-1,4-polyisoprene which comprises polymerizing isoprene in the presence of a catalyst which is the interaction product of vanadium trichloride, an aluminum trihydrocarbyl and a tetrahydrocarbyl titanate wherein the hydrocarbyl radicals are selected from the saturated aliphatic and alicyclic hydrocarbon radicals having from 1 to 12 carbon atoms and aromatic hydrocarbon radicals having from 6 to 12 carbon atoms, the molar ratio of aluminum trihydrocarbyl to vanadium trichloride being from about 2:1 to about 200:1, the molar ratio of aluminum trihydrocarbyl to titanate being from about 2:1 to about 80:1, and the molar ratio of vanadium trichloride to titanate being from about 1:8 to about 8:1, the aluminum trihydrocarbyl and the titanate being allowed to react substantially in the presence of the vanadium trichloride.

2. The method of claim 1, wherein the catalytic interaction product used per 100 grams of isoprene comprises from 0.002 g. to 1 gram of vanadium trichloride, the molar ratio of aluminum trihydrocarbyl to vanadium trichloride is from 5:1 to 80:1, the molar ratio of aluminum trihydrocarbyl to titanate is from 5:1 to 40:1, and the molar ratio of vanadium trichloride to titanate is from 1:2 to 4:1.

3. The method of claim 1, wherein the catalytic interaction product used per 100 grams of isoprene comprises from 10 to 200 milligrams of vanadium trichloride, the molar ratio of aluminum trihydrocarbyl to vanadium trichloride is from 5:1 to 20:1, the molar ratio of aluminum trihydrocarbyl to titanate is from 10:1 to 20:1, and the molar ratio of vanadium trichloride to titanate is from 1:2 to 4:1.

4. The method of claim 1, in which the polymerization reaction mixture comprises from 1 to 5 parts by weight of an inert hydrocarbon solvent per part by weight of isoprene.

5. The method of claim 1 wherein said vanadium trichloride is supported on a finely divided inert solid carrier.

6. The method of producing essentially pure synthetic balata comprising polymerizing isoprene in the presence of a catalyst, said catalyst being prepared by admixing three components in the presence of an inert hydrocarbon solvent for two of the said components, the two soluble components being an aluminum trihydrocarbyl and a titanate and the third component being vanadium trichloride, the two soluble components being allowed to react substantially in the presence of the vanadium trichloride; said aluminum trihydrocarbyl compound being present in an amount of from about 5 to about 20 moles per mole of vanadium trichloride employed, the hydrocarbyl groups therein being further characterized as being selected from among the aromatic and saturated aliphatic radicals having not more than 12 carbon atoms; the titanate being present in an amount such that there are from about 10 to about 20 moles of the said aluminum trihydrocarbyl compound present per mole of titanate, said titanate being a tetrahydrocarbyl titanate wherein the hydrocarbyl radicals are selected from the aromatic and saturated aliphatic and alicyclic hydrocarbon radicals having not more than 12 carbon atoms.

7. The method of claim 6 wherein the vanadium trichloride is supported on a finely divided inert material, wherein the hydrocarbyl groups of the titanate each contain from 3 to 8 carbon atoms and wherein the hydrocarbyl group of said aluminum trihydrocarbyl contains from 2 to 6 carbon atoms.

8. The method of claim 7 wherein the said solvent comprises a liquid selected from the group consisting of benzene, toluene, butane, pentane, hexane and heptane.

References Cited in the file of this patent

UNITED STATES PATENTS

| | | |
|---|---|---|
| 2,881,156 | Pilar | Apr. 7, 1959 |
| 2,928,815 | Hammer | Mar. 15, 1960 |
| 2,938,019 | Stuart | May 24, 1960 |
| 2,953,552 | Stampa | Sept. 20, 1960 |

FOREIGN PATENTS

| | | |
|---|---|---|
| 545,952 | Belgium | Sept. 10, 1956 |